United States Patent [19]
Mehrotra et al.

[11] Patent Number: 5,525,134
[45] Date of Patent: *Jun. 11, 1996

[54] SILICON NITRIDE CERAMIC AND CUTTING TOOL MADE THEREOF

[75] Inventors: Pankaj K. Mehrotra; Robert D. Nixon, both of Greenburg, Pa.

[73] Assignee: Kennametal Inc., Latrobe, Pa.

[ * ] Notice: The term of this patent shall not extend beyond the expiration date of Pat. No. 5,382,273.

[21] Appl. No.: 371,641

[22] Filed: Jan. 12, 1995

Related U.S. Application Data

[63] Continuation of Ser. No. 4,022, Jan. 15, 1993, Pat. No. 5,382,273.

[51] Int. Cl.$^6$ .......................... C04B 35/587; B24D 17/00
[52] U.S. Cl. .................... 51/307; 501/97; 501/98
[58] Field of Search ................ 51/307, 308, 309, 51/97, 98

[56]  References Cited

U.S. PATENT DOCUMENTS

| | | | |
|---|---|---|---|
| 3,836,374 | 9/1974 | Richerson et al. | 106/55 |
| 3,950,464 | 4/1976 | Masaki | 264/65 |
| 3,992,497 | 11/1976 | Terwilliger et al. | 264/56 |
| 4,218,257 | 8/1980 | Oda et al. | 106/73.5 |
| 4,280,973 | 7/1981 | Moskowitz et al. | 264/63 |
| 4,356,136 | 10/1982 | Mangels | 264/65 |
| 4,409,003 | 10/1983 | Sarin et al. | 51/295 |
| 4,492,765 | 1/1985 | Buljan | 501/97 |
| 4,557,244 | 12/1985 | Allor | 125/1 |
| 4,560,669 | 12/1985 | Matsuhiro et al. | 501/97 |
| 4,603,116 | 7/1986 | Smith et al. | 501/97 |
| 4,607,017 | 8/1986 | Wolfe et al. | 501/98 |
| 4,628,039 | 12/1986 | Mizutani et al. | 501/97 |
| 4,640,693 | 2/1987 | Bhat et al. | 51/295 |
| 4,650,498 | 3/1987 | Buljan | 51/309 |
| 4,652,276 | 3/1987 | Burden | 51/308 |
| 4,818,733 | 4/1989 | Shirai et al. | 501/97 |
| 4,848,984 | 7/1989 | Ezis et al. | 51/309 |
| 4,883,776 | 11/1989 | Pyzik et al. | 501/10 |
| 4,886,767 | 12/1989 | Goto et al. | 501/97 |
| 4,904,624 | 2/1990 | Yeckley | 501/97 |
| 4,919,689 | 4/1990 | Pyzik et al. | 51/309 |
| 4,935,388 | 6/1990 | Lucek | 501/97 |
| 4,943,543 | 7/1990 | Ingelstrom | 501/96 |
| 4,956,315 | 9/1990 | Mehrotra et al. | 501/98 |
| 4,977,112 | 12/1990 | Matsui | 501/97 |
| 4,978,645 | 12/1990 | Ukyo et al. | 501/98 |
| 4,980,322 | 12/1990 | Wickel et al. | 501/97 |
| 5,002,907 | 3/1991 | Hayakawa et al. | 501/97 |
| 5,015,608 | 5/1991 | Matsuhisa et al. | 501/97 |
| 5,021,372 | 6/1991 | Pyzik et al. | 501/97 |
| 5,026,671 | 6/1991 | Hanzawa et al. | 501/96 |
| 5,045,513 | 9/1991 | Mizuno et al. | 501/98 |
| 5,089,448 | 2/1992 | Kawakami et al. | 501/97 |
| 5,089,449 | 2/1992 | Miwa et al. | 501/98 |
| 5,194,201 | 3/1993 | Miwa et al. | 264/56 |
| 5,399,536 | 3/1995 | Yamakawa et al. | 501/97 |
| 5,445,776 | 8/1995 | Homma et al. | 265/65 |
| 5,449,649 | 9/1995 | Li et al. | 501/97 |
| 5,472,919 | 12/1995 | Mitomo et al. | 501/97 |

OTHER PUBLICATIONS

Israelsson, "A Progress Report on Cutting Tool Materials," American Machinist, Dec. 1991, pp. 39, 40.

*Primary Examiner*—Karl Group
*Attorney, Agent, or Firm*—John J. Prizzi

[57]  ABSTRACT

Provided is a silicon nitride based ceramic which is particularly useful for use as a cutting tool in the high speed chip forming machining of metallic materials. The ceramic is preferably composed of at least 85 volume percent (v/o) beta silicon nitride phase and less than about 5 v/o intergranular phase. The ceramic has greater than 0.2 weight percent (w/o) magnesia, greater than 0.2 w/o yttria, where the sum of magnesia and yttria is less than 5 w/o. The ceramic preferably has less than 0.2 v/o porosity.

50 Claims, 4 Drawing Sheets

SILICON NITRIDE CERAMIC AND CUTTING TOOL MADE THEREOF

This is a continuation of application Ser. No. 08/004,022 filed on Jan. 15, 1993, now U.S. Pat. No. 5,382,273.

BACKGROUND OF THE INVENTION

The present invention relates to silicon nitride based ceramics and their use, particularly as cutting tools.

In the past, it has been taught by U.S. Pat. No. 4,652,276 that beta silicon nitride compositions useful to machine cast iron must contain both yttrium oxide (yttria) and magnesium oxide (magnesia) in the range of 5 to 20 weight percent (w/o), total, to obtain long tool life (i.e. improved wear resistance) and improved chipping resistance in the machining of nodular cast iron.

$Y_2O_3$ and MgO are added in the amounts indicated to produce a glassy intergranular phase during sintering in an amount necessary to the achievement of the proper densification of the ceramic and improved metal cutting performance.

It was found that compositions composed of 98 w/o $Si_3N_4$–1 w/o MgO–1 w/o $Y_2O_3$ have poor chipping resistance and poor wear resistance compared to the compositions in accordance with U.S. Pat. No. 4,652,276 (see col. 4, tables I and II).

There, however, remains a need for more advanced silicon nitride ceramics and cutting tools made therefrom which have improved properties and cutting performance, but can also be densified by economical densification methods.

BRIEF SUMMARY OF THE INVENTION

Applicants have now discovered an improved silicon nitride based ceramic composition having improved metal cutting performance, mechanical and physical properties over the prior art.

Their discovery is surprising in that their silicon nitride based ceramic composition contains less than 5 w/o total of yttrium oxide and magnesium oxide, which is contrary to the teaching of the prior art. In addition, despite using a composition which is contrary to the prior art, the present invention preferably and unexpectedly has improved hardness at elevated temperatures such as 1000° C., and improved transverse rupture strength, and improved Weibull modulus compared to the prior art.

More particularly, a silicon nitride based ceramic composition is provided preferably having at least 85 volume percent (v/o) beta silicon nitride phase and an intergranular phase which preferably forms about 1 to 5 v/o of the composition. In addition to silicon and nitrogen, the ceramic contains on an element basis about 1.3 to 3.5 w/o oxygen, about 0.16 to 3.15 w/o yttrium, about 0.12 to 2.7 w/o magnesium. The magnesium, yttrium and oxygen contents are controlled such that on an oxide basis, the invention contains greater than 0.2 w/o yttria, greater than 0.2 w/o magnesia wherein the sum of magnesia and yttria is less than 5 w/o. Preferably, there is at least 0.5 w/o of each, yttria and magnesia. Preferably, yttria is less than 4.0 w/o and magnesia is less than 4.5 w/o. The sum of magnesia and yttria is preferably at least 1.5 w/o on the low end. On the high end, the sum of magnesia and yttria is preferably less than 3.5 w/o. A preferred composition contains 0.5 to 1.5 w/o magnesia and 0.5 to 1.5 w/o yttria. Oxygen contents of about 1.3 to 2.2 w/o and 1.3 to 1.9 w/o are also contemplated. The invention preferably has a porosity of less than 0.2, and more preferably less than 0.1 v/o.

More preferably, silicon nitride forms at least 95 and most preferably at least 96 v/o of the composition. Yttrium and magnesium are preferably added to the composition as yttria and magnesia.

Ceramic cutting tools for the high speed chip forming machining of metallic materials, such as cast irons, are made composed of the foregoing compositions.

These cutting tools in accordance with the present invention have a flank face and a rake face over which chips formed during chip forming machining flow. At a juncture of the rake face and flank face a cutting edge is formed for cutting into metallic materials at high speeds to form chips.

These and other aspects of the present invention will become more apparent upon review of the drawings which are briefly described below in conjunction with the detailed description of the invention which follows.

DETAILED DESCRIPTION OF THE INVENTION

Figure 1:
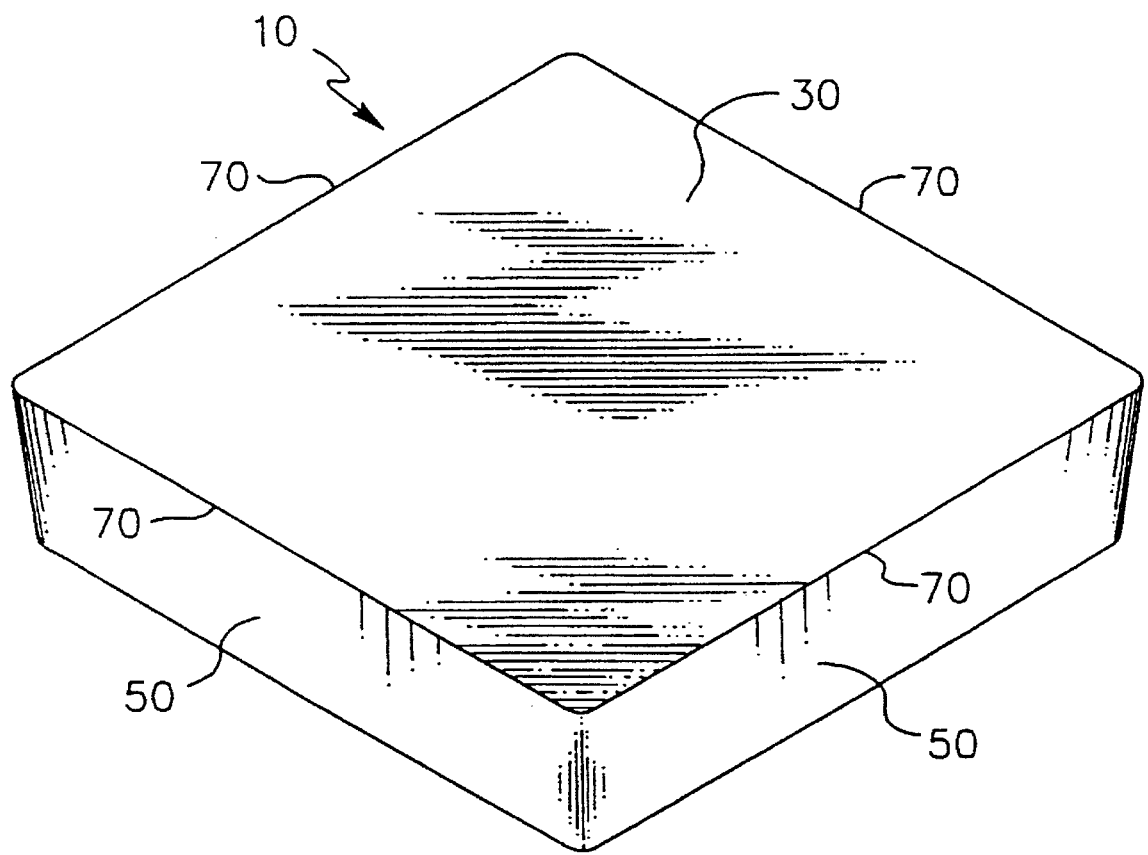
FIG. 1 shows an embodiment of a cutting tool in accordance with the present invention.

In accordance with the present invention, FIG. 1 shows a preferred embodiment of an indexable ceramic metalcutting insert 10 composed of the silicon nitride based ceramic material discovered by the present inventors. The metalcutting insert 10 is preferably used in the high speed (>500 surface feet/minute) chip forming machining (e.g. turning, milling, grooving and threading) of metallic materials. This invention is most preferably used in the high speed machining of cast irons (e.g., gray and nodular irons), and is particularly useful in roughing and interrupted cutting of these materials where a combination of high toughness and high wear resistance is required. The metalcutting insert has a rake face 30 over which chips, formed during high speed machining of high temperature alloys and cast irons, flow. Joined to the rake surface 30 are flank faces 50. At the juncture of the rake face and the flank faces 50 is formed a cutting edge 70 for cutting into the high temperature alloys and cast irons at high speeds. The cutting edge 70 may be in either a sharp, honed, chamfered or chamfered and honed condition depending on application requirements. The hone may be any of the styles or sizes of hones used in the industry. Preferably, the cutting edge 70 has a chamfer (i.e., T-land). The cutting insert may also be made in standard shapes and sizes (for example SNGN-434T, SNGN-436T, SPGN-633T, SPGN-634T, inserts may also be made with holes therein as well). The chamfer may typically have a width of 0.003 to 0.020 inch and an angle of about 20° to 30°.

The metalcutting insert described above is composed of a silicon nitride composition in accordance with the present invention. This composition has a microstructure of beta phase silicon nitride grains having an intergranular phase or phases disposed between the silicon nitride grains. The beta silicon nitride grains preferably form at least 85 v/o of the ceramic and more preferably at least 95 v/o. The beta silicon nitride grains have both an equiaxed and an accicular, or needlelike structure and preferably have a diameter of less than 1 μm.

The intergranular phase preferably forms about 1 to about 5 v/o of the ceramic and is preferably a glass which is a product of the sintering aids magnesia, yttria, and silicon oxide impurities from the silicon nitride.

The sintering aids used are preferably magnesia and yttria. However, it may be possible to substitute a high temperature oxide such as those of hafnium and the lanthanide series of elements for all or part of the yttria. It may also be possible to substitute calcia for all or part of the magnesia used herein.

There should be at least 0.2 w/o magnesia and 0.2 w/o yttria in the composition of the present invention for sinterability. For cutting insert applications, preferably there should be at least 0.5 w/o magnesia and at least 0.5 w/o yttria to assure adequate densification, i.e. a density of at least 3.19 g/cm$^3$ or preferably a porosity level below 0.2 and more preferably below 0.1 v/o. A composition containing 1.0 w/o MgO and 0.5 w/o Y$_2$O$_3$ has been found to provide adequate sinterability for cutting insert applications. Therefore, it is preferred that the sum of magnesia and yttria should be at least 1.5 v/o.

As sintering aid content goes up, the hardness of the present invention, both at room temperature and elevated temperatures, goes down. It is, therefore, important that the sum of yttria and magnesia be maintained below 5 w/o. Individually, yttria may be as high as 4.0 w/o and magnesia as high as 4.5 w/o. For the aforementioned reason, it is preferred that the sum of magnesia and yttria be less than 3.5 w/o, and more preferably less than 3.0 w/o, and most preferably less than or equal to about 2 w/o. Compositions in the range of 0.5 to 1.5 w/o magnesia and 0.5 to 1.5 w/o yttria have been found to have excellent metalcutting performance in the high speed rough milling of cast irons.

The compositions in accordance with the present invention preferably have a Vickers Hardness Number (VHN, 1 kg load) at room temperature greater than 1700 kg/mm$^2$ and at 1000° C. of greater than 800 and more preferably greater than 900 kg/mm$^2$. The transverse rupture strength of the present invention is greater than 150 and more preferably greater than 160 ksi in the 3 point bend test and preferably has a Weibull modulus of at least 15. Young's modulus of the present invention is preferably at least 300 GPa and more preferably at least 320 GPa. The thermal diffusivity (cm$^2$/sec) is preferably at least 0.2, and the thermal conductivity (cal./sec-cm° C.) is preferably at least 0.1.

The significant advantages of the present invention are further indicated by the following examples which are intended to be purely illustrative of the present invention.

Cutting inserts of the SPGN-633T style were manufactured using the following techniques. The starting materials, in the proportions shown in Table I were milled for 24 hours with Si$_3$N$_4$ media to obtain a BET surface area of about 14 m$^2$/g and a particle size range in which at least 90% of the powder was less than 1 μm. After milling, the powder was dried, screened and then pelletized using an organic binder.

TABLE I

| Material | Particle Size 90%< (μm) | Nominal Wt. % | Surface Area (BET) m$^2$/g |
|---|---|---|---|
| Si$_3$N$_4$ Grade SN-E10 | 1.4 | 98 | 10–12 |
| Y$_2$O$_3$ Grade "fine" | 2.5 | 1 | 10–16 |
| MgO Grade Light USP/FCC | — | 1 | 40 |

Grade SN-E10 Si$_3$N$_4$ powder is available from Ube Industries, Ltd., of Tokyo, Japan. This powder is equiaxed, has a mean particle size of about 0.2 μm, and is approximately 100 percent crystalline, with greater than 95 percent being alpha silicon nitride and the remainder, if any, is beta silicon nitride. The composition of grade SN-E10 silicon nitride is (in w/o): N>38.0; O<2.0; C<0.2; Cl<100 ppm; Fe<100 ppm; Ca<50 ppm; Al<50 ppm; and the remainder Si.

Fine grade Y$_2$O$_3$ is available from Herman C. Starck, Inc., New York, N.Y. This powder is a high purity powder of at least 99.95% by weight Y$_2$O$_3$. The maximum weight percent of metallic impurities is 0.05.

Grade Light USP/FCC, magnesia is available from the Chemical Division of Fisher Scientific, Inc., Fair Lawn, N.J. This powder has the following composition: MgO≧96 w/o, Acid insolubles≦0.1 w/o; arsenic≦3 ppm; calcium≦1.1 w/o; heavy metals≦0.004 w/o; iron≦0.05 w/o; lead≦10 ppm; loss on ignition≦10 w/o.

After pelletizing, the material was then pill pressed to form green inserts of the desired geometry. The green inserts were then heated in air at 600° F. to drive off the fugitive organic binder. Subsequently, the green inserts were sintered utilizing a suitable Si$_3$N$_4$ based setting powder for 1 to 2 hours in one atmosphere of nitrogen at 1800°–1850° C. The sintered inserts were then hot isostatically pressed at about 1750° C. in a 20,000 psi nitrogen atmosphere to achieve final densification. The resulting inserts were then ground to final size using a 100 or 180 mesh grit size grinding wheel for top and bottom grinding. In this manner, SPGN-633T inserts having a T or K land of 0.008"×20° were made. The characteristic properties of this composition are shown in Tables II, III and IV below:

TABLE II

| Properties | Invention | Prior Art* |
|---|---|---|
| Hardness, Rockwell A | | |
| Range | 93.0–94.0 | 92.8–93.2 |
| Preferred Range | 93.3–94.0 | |
| Microhardness VHN (18.5 kg load), GPa | | |
| Range | 14.5–15.5 | 14.2–14.9 |
| Preferred Range | 14.7–15.4 | |
| Hot Hardness VHN (1 kg. load) (Kg/mm$^2$) | | |
| 20° C. | 1772 ± 24 | 1675 ± 9 |
| 200° C. | 1663 ± 15 | |
| 400° C. | 1475 ± 11 | |
| 500° C. | | 1248 |
| 600° C. | 1397 ± 19 | |
| 800° C. | 1268 ± 17 | |
| 1000° C. | 936 ± 16 | 646 ± 5 |

*Prior Art composition contains about 2.2 w/o yttrium (2.8 w/o yttria) and about 1.4 w/o magnesium (2.3 w/o magnesia) for a total yttria and magnesia content of about 5.1 w/o.

TABLE III

|  | Invention | Prior Art |
| --- | --- | --- |
| Chemical Analysis |  |  |
| O: | 1.8–2.9 w/o | 3.24 w/o |
| C: | 0.09 w/o | 0.55 w/o |
| Mg: | 0.6 w/o | 1.43 w/o |
| Y: | 0.7–0.8 w/o | 2.19 w/o |
| Ca: | 100 ppm | N.A. |
| Zr: | <0.01 w/o | <0.01 w/o |
| Al: | ≦0.2 | 0.02 w/o |
| Fe: | 0.01 w/o | 0.01 w/o |
| Density (g/cm$^3$) | 3.19–3.20 | 3.20 |
| Thermal Diffusivity (cm$^2$/sec.) | 0.205 | 0.189 |
| Thermal Conductivity (cal/sec-cm°C) | 0.114 | 0.106 |
| Crystalline Phases present: (as determined by X-Ray Diff.) | 100% β-Si$_3$N$_4$ | 100% β-Si$_3$N$_4$ |

TABLE IV

|  | Invention | Prior Art |
| --- | --- | --- |
| Fracture Toughness K$_{IC}$ (E&C) (18.5 kg load Palmqvist Method) MPa · m$^{1/2}$ | 7.1–7.5 | 7.12 ± .04 |
| Transverse Rupture Strength (3 point bend, 400 grit surface ground) (Ksi) | 184.5 ± 10.4 | 124.1 ± 15.0 |
| Weibull modulus | 19.5 | 8.3 |
| Young's modulus, GPa | 300–350 | 293.5 |
| Shear modulus, GPa | 135.8 | 113.1 |

Figure 2:
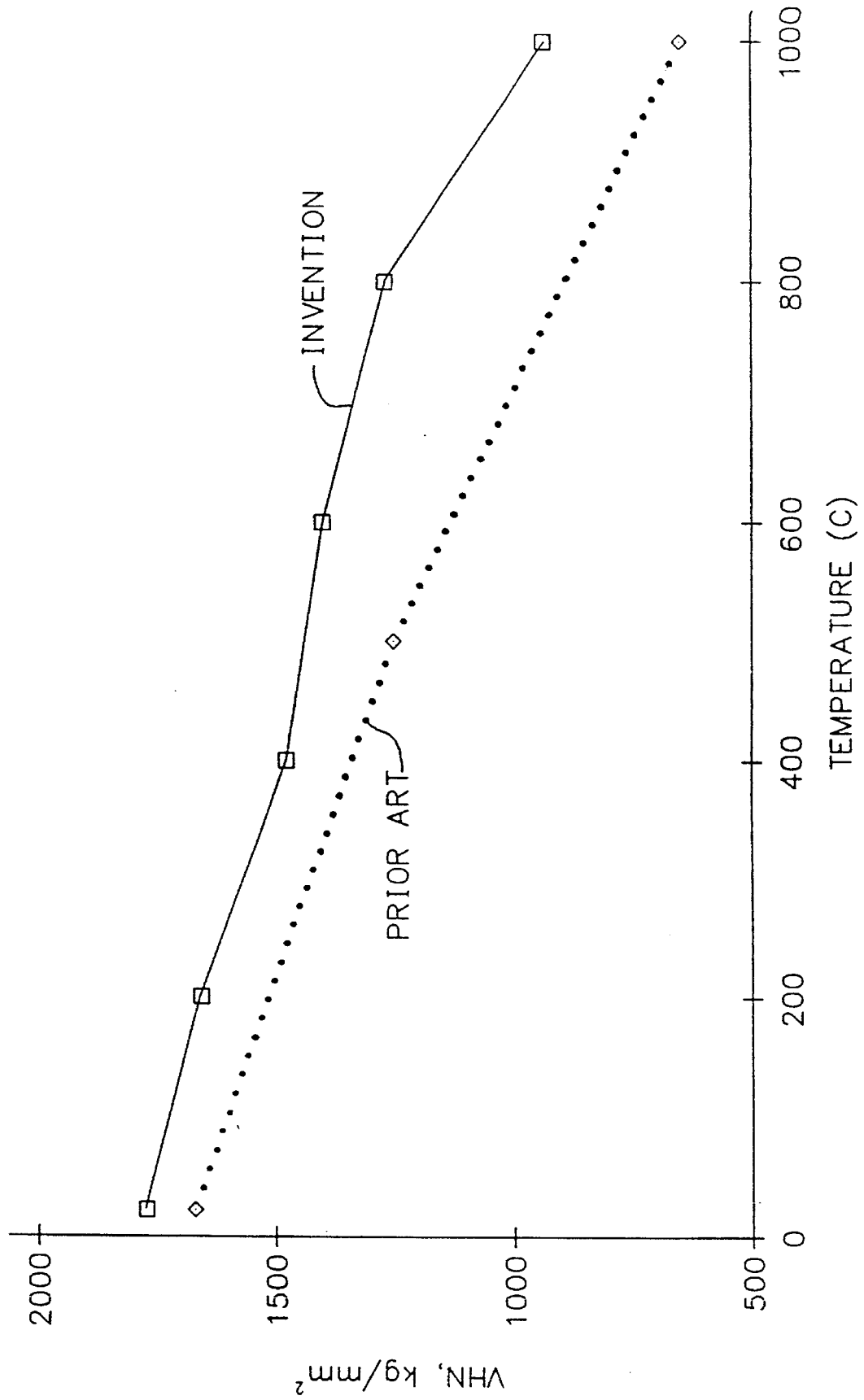
FIG. 2 shows the hardness of an embodiment of the present invention as a function of temperature.

FIG. 2 shows the elevated temperature Vickers Hardness Number (1 kg load) in kg/mm$^2$ as a function of temperature in degrees centigrade. As can be seen at all temperatures from room temperature to 1000° C. the present invention has a higher hardness than a prior art Si$_3$N$_4$ composition containing 2.8 w/o yttria and 2.3 w/o magnesia.

Figure 3:
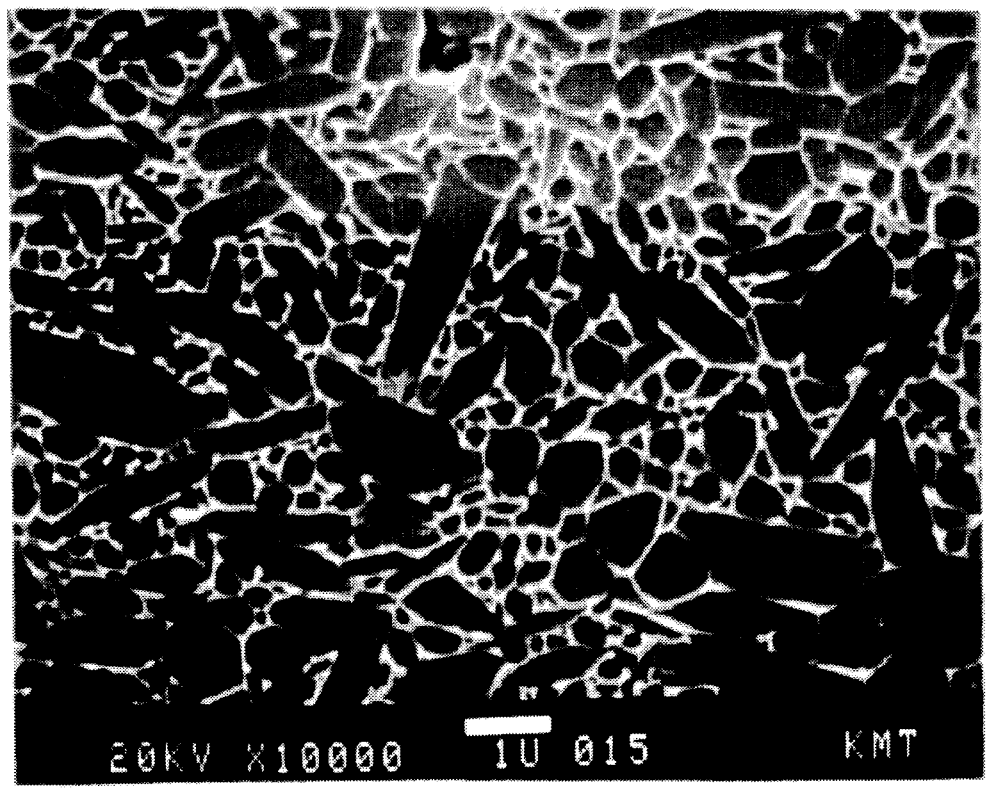
FIG. 3 is a scanning electron micrograph of an embodiment of the present invention showing its microstructure.
Figure 4:
FIG. 4 is a scanning electron micrograph of a fracture surface of an embodiment of the present invention.

FIG. 3 shows 10,000× magnification view of a metallographically prepared surface of the present invention. The β-Si$_3$N$_4$ grains (gray) have a needle-like or accicular form or an equiaxed form. The intergranular phase (white) surrounds the β-Si$_3$N$_4$ grains and is estimated to form about 3 to 4 v/o of the material. The needle-like structure of some of the β-Si$_3$N$_4$ grains is further emphasized by FIG. 4 which shows a scanning electron micrograph at 5000× of a fracture surface from a broken transverse rupture specimen. From these electron micrographs, it can be seen that the average diameter of the β-Si$_3$N$_4$ grains is less than about 1 μm.

The SPGN-633T inserts were then tested in the fly cut milling of a gray cast iron engine block (including 6 cylinder bores and cooling channels for a diesel engine) against a prior art Si$_3$N$_4$ composition. The prior art composition contains about 2.2 w/o yttrium (=2.8 w/o yttria) and 1.4 w/o magnesium (=2.3 w/o magnesia), for a total magnesia and yttria content of 5.1 w/o. The test conditions were:

Speed: 3000 sfm
Feed: 0.006 IPT
DOC: 0.080 inch
Coolant: Dry
Cutter Style: KDPR 8" 30° lead angle (See Kennametal Milling/87 Catalogue p. 26 (1986))
Length of Pass: 33.75"/Width: 8"

Figure 5:
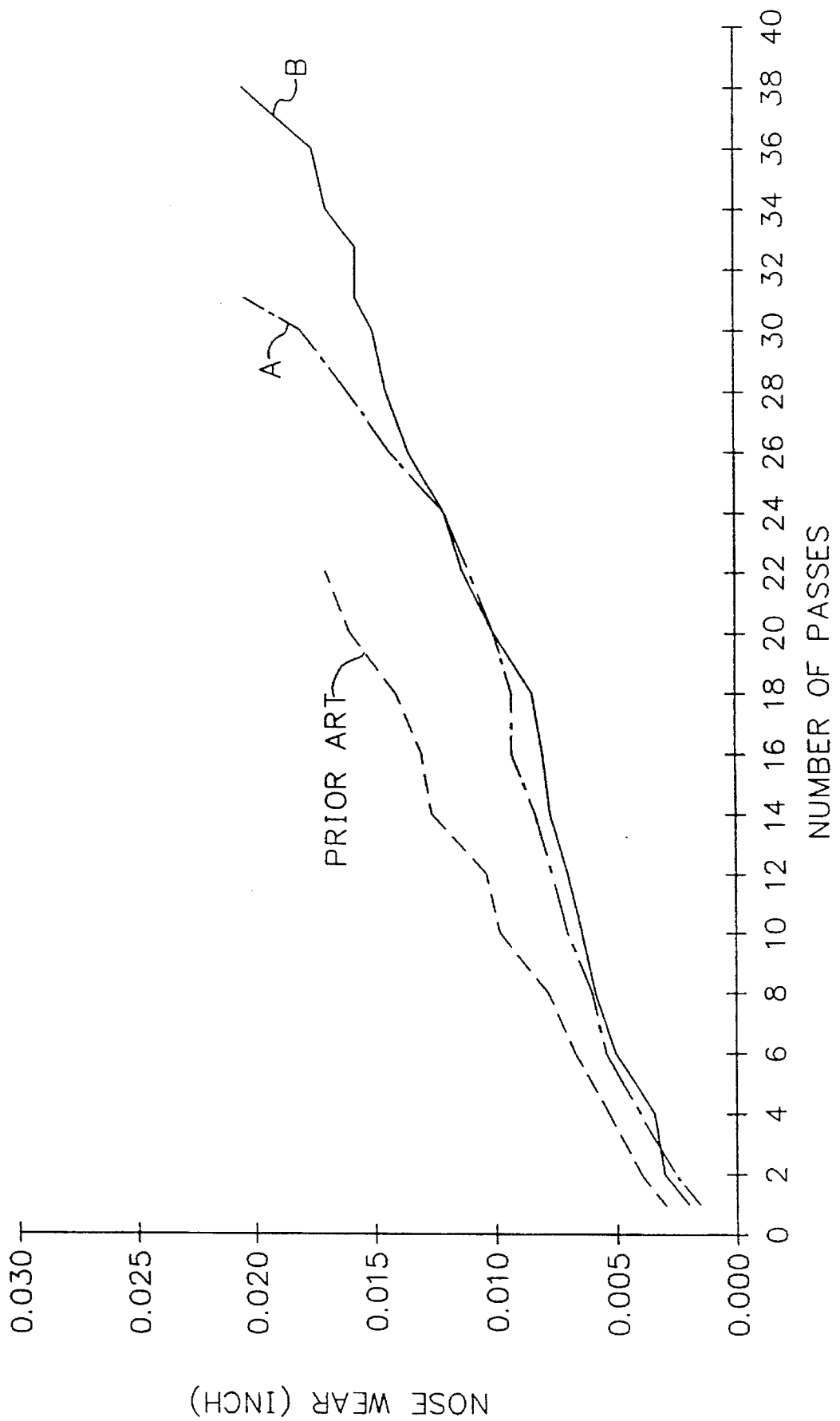
FIG. 5 is a graph of cutting tool nose wear as a function of the number of cutting passes for a prior art tool and two embodiments of tools in accordance with the present invention.

The results of this test are plotted in FIG. 5, where it can be seen that both inserts in accordance with the present invention, A (100 grit) and B (180 grit), outperformed the prior art material, by achieving a greater number of passes before failure. All inserts failed by chipping. As shown in FIG. 5, the rate of nose wear in the present invention was less than that produced in the prior art. Therefore, as clearly demonstrated by this test, the present invention surprisingly has both enhanced chipping resistance and wear resistance over the prior art in the milling of cast iron under the conditions shown above.

Optionally, the cutting inserts in accordance with the present invention may be coated with a refractory coating for improved wear resistance. It is contemplated that Al$_2$O$_3$, TiC and TiN coatings may be applied alone or in combination with each other.

Optionally, the wear resistance of the present invention may also be improved by the substitution of a refractory particulate material for a minor portion of the β-Si$_3$N$_4$ phase in the composition. The refractory material may form from 1–35 v/o, and preferably 1–10 v/o of the ceramic composition. Refractory materials which may be dispersed in the β silicon nitride matrix include the nitrides, carbides and carbonitrides of Ti, Hf and Zr, and tungsten carbide as well, alone or in combination with each other.

The present invention is preferably used in the high speed roughing and interrupted cutting of cast irons. There may also be applications in the roughing and interrupted cutting of superalloys where the present invention may perform well. However, most preferably the present invention is best utilized in the milling of cast irons under the following conditions:

Speed: 500–4000 sfm
Feed: 0.004–0.020 IPT
DOC: up to 0.25 inch

By way of definition as used in this specification (unless it is clear from the context that starting powders are being referred to) and in the claims appended hereto, the concentration in weight percent of the yttria (Y$_2$O$_3$) and magnesia (MgO) are calculated values based on the concentration of the metallic elements, Mg and Y in weight percent determined by chemical analysis of the densified ceramic. The calculated weight percent of Y$_2$O$_3$ is equal to the measured weight percent of Y divided by 0.787. The calculated weight percent of MgO is equal to the measured weight percent of Mg divided by 0.601. It should be understood that no assertion is being made that MgO and Y$_2$O$_3$ exist as separate phases in the densified ceramic. The use of oxide concentrations in conjunction with the final densified ceramic is done merely to provide a convenient way of distinguishing the claimed invention from the prior art.

All patents and other publications referred to herein are hereby incorporated by reference in their entireties.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A ceramic cutting tool for high speed chip forming machining of a metallic material, said ceramic cutting tool comprising:

a rake face over which chips formed during said chip forming machining of said metallic material will flow;
a flank face;

a cutting edge, for cutting into said metallic material at high speeds to form said chips, formed at a junction of said rake face and said flank face;

said ceramic consisting essentially of beta silicon nitride phase;

and an intergranular phase wherein said ceramic has at least 0.2 w/o yttria and at least 0.2 w/o magnesia, wherein the sum of yttria and magnesia is less than 3.5 w/o, and wherein said ceramic has 1.3 w/o to 2.2 w/o oxygen and a density of at least 3.19 g/cm$^3$.

2. The ceramic cutting tool according to claim 1 wherein the beta silicon nitride phase forms at least 85 v/o of said ceramic.

3. The ceramic cutting tool according to claim 1 wherein the sum of yttria and magnesia is at least 1.5 w/o.

4. The ceramic cutting tool according to claim 1 having a hardness at room temperature greater than 1700 kg/mm$^2$ and at 1000° C. the hardness is greater than 800 kg/mm$^2$.

5. The ceramic cutting tool according to claim 1 having a transverse rupture strength greater than 150 Ksi.

6. The ceramic cutting tool according to claim 1 having a Weibull modulus of at least 15.

7. The ceramic cutting tool according to claim 1 having a thermal diffusivity of at least 0.2 cm$^2$/s and a thermal conductivity of at least 0.1 calorie/sec.-cm°C.

8. The ceramic cutting tool according to claim 1 having a Young's Modulus of elasticity of at least 300 GPa.

9. The cutting insert according to claim 1 wherein the yttria is 0.5 to 1.5 w/o, and the magnesia is 0.5 to 1.5 w/o;

wherein the hardness at room temperature is at least 1700 kg/mm$^2$ and at 1000° C. hardness is at least 900 kg/mm$^2$;

wherein the transverse rupture strength is greater than 160 Ksi;

wherein the Weibull modulus is at least 15;

and wherein Young's modulus is at least 300 GPa.

10. The ceramic cutting tool according to claim 1 wherein the sum of yttria and magnesia is less than or equal to about 2 w/o.

11. The ceramic cutting tool according to claim 9 wherein the sum of yttria and magnesia is less than or equal to about 2 w/o.

12. The ceramic cutting tool according to claim 1 wherein the yttria is 0.5 to 1.5 w/o, and the magnesia is 0.5 to 1.5 w/o.

13. The ceramic cutting tool according to claim 12 wherein said ceramic has 1.3 to 1.9 w/o oxygen.

14. The ceramic cutting tool according to claim 10 wherein said ceramic has 1.3 to 1.9 w/o oxygen.

15. A ceramic consisting essentially of:

Beta silicon nitride phase and intergranular phase, wherein said ceramic has greater than 0.2 w/o yttria, greater than 0.2 w/o magnesia, wherein the sum of yttria and magnesia is less than 3.5 w/o, wherein said ceramic has 1.3 w/o to 2.2 w/o oxygen and a density of at least 3.19 g/cm$^3$.

16. The ceramic according to claim 15 wherein the magnesia is between 0.5 to 1.5 w/o, and the yttria is between 0.5 to 1.5 w/o.

17. The ceramic according to claim 15 wherein the sum of yttria and magnesia is less than or equal to about 2 w/o.

18. The ceramic according to claim 17 wherein oxygen is 1.3 to 1.9 w/o of said ceramic.

19. The ceramic according to claim 16 wherein the beta silicon nitride phase forms at least 85 v/o of said ceramic.

20. The ceramic cutting tool according to claim 1 further comprising:

a refractory coating on said cutting tool.

21. The ceramic cutting tool according to claim 20 wherein said refractory coating includes Al$_2$O$_3$.

22. The ceramic cutting tool according to claim 1 wherein said beta silicon nitride phase forms at least 95 v/o of said ceramic.

23. The ceramic cutting tool according to claim 10 further comprising a refractory coating on said cutting tool, and wherein the refractory coating includes Al$_2$O$_3$.

24. The ceramic cutting tool according to claim 23 wherein said beta silicon nitride phase forms at least 95 v/o of said ceramic.

25. The ceramic cutting tool according to claim 21 wherein said refractory coating also includes TiN.

26. The ceramic cutting tool according to claim 24 wherein said refractory coating also includes TiN.

27. A ceramic cutting tool for high speed chip forming machining of metallic materials, said ceramic cutting tool comprising:

a rake face over which chips formed during said chip forming machining of metallic materials will flow;

a flank face;

a cutting edge, for cutting into said metallic materials at high speeds to form said chips, formed at a junction of said rake face and said flank face;

said ceramic consisting essentially of beta silicon nitride phase;

and an intergranular phase wherein said ceramic has at least 0.2 w/o yttria and at least 0.2 w/o magnesia, wherein the sum of yttria and magnesia is less than 3.5 w/o, and a density of at least 3.19 g/cm$^3$.

28. The ceramic cutting tool according to claim 27 wherein the beta silicon nitride phase forms at least 85 v/o of said ceramic.

29. The ceramic cutting tool according to claim 27 wherein the sum of yttria and magnesia is at least 1.5 w/o.

30. The ceramic cutting tool according to claim 27 having a hardness at room temperature greater than 1700 kg/mm$^2$ and at 1000° C. the hardness is greater than 800 kg/mm$^2$.

31. The ceramic cutting tool according to claim 27 having a transverse rupture strength greater than 150 Ksi.

32. The ceramic cutting tool according to claim 27 having a Weibull modulus of at least 15.

33. The ceramic cutting tool according to claim 27 having a thermal diffusivity of at least 0.2 cm$^2$/s and a thermal conductivity of at least 0.1 calorie/sec.-cm°C.

34. The ceramic cutting tool according to claim 27 having a Young's Modulus of elasticity of at least 300 GPa.

35. The cutting insert according to claim 27 wherein the yttria is 0.5 to 1.5 w/o, and the magnesia is 0.5 to 1.5 w/o;

wherein the hardness at room temperature is at least 1700 kg/mm$^2$ and at 1000° C. hardness is at least 900 kg/mm$^2$;

wherein the transverse rupture strength is greater than 160 Ksi;

wherein the Weibull modulus is at least 15;

and wherein Young's modulus is at least 300 GPa.

36. The ceramic cutting tool according to claim 27 wherein the sum of yttria and magnesia is less than or equal to about 2 w/o.

37. The ceramic cutting tool according to claim 27 wherein the sum of yttria and magnesia is less than or equal to about 2 w/o.

38. The ceramic cutting tool according to claim 27 wherein the yttria is 0.5 to 1.5 w/o, and the magnesia is 0.5 to 1.5 w/o.

39. A ceramic consisting essentially of:

Beta silicon nitride phase and intergranular phase, wherein said ceramic has greater than 0.2 w/o yttria, greater than 0.2 w/o magnesia, wherein the sum of yttria and magnesia is less than 3.5 w/o and a density of at least 3.19 g/cm$^3$.

40. The ceramic according to claim 39 wherein the magnesia is between 0.5 to 1.5 w/o, the yttria is between 0.5 to 1.5 w/o.

41. The ceramic according to claim 39 wherein the sum of yttria and magnesia is less than or equal to about 2 w/o.

42. The ceramic according to claim 40 wherein the beta silicon nitride phase forms at least 85 v/o of said ceramic.

43. The ceramic cutting tool according to claim 27 further comprising:

a refractory coating on said cutting tool.

44. The ceramic cutting tool according to claim 43 wherein said refractory coating includes Al$_2$O$_3$.

45. The ceramic cutting tool according to claim 27 wherein said beta silicon nitride phase forms at least 95 v/o of said ceramic.

46. The ceramic cutting tool according to claim 38 further comprising a refractory coating on said cutting tool, and wherein the refractory coating includes Al$_2$O$_3$.

47. The ceramic cutting tool according to claim 46 wherein said beta silicon nitride phase forms at least 95 v/o of said ceramic.

48. The ceramic cutting tool according to claim 44 wherein said refractory coating also includes TiN.

49. The ceramic cutting tool according to claim 47 wherein said refractory coating also includes TiN.

50. The ceramic cutting tool according to claim 27 wherein said chip forming machining consists essentially of milling and said metallic material consists essentially of a cast iron.

* * * * *